(12) United States Patent
Bellagamba et al.

(10) Patent No.: US 8,705,403 B2
(45) Date of Patent: Apr. 22, 2014

(54) LOAD BALANCING MULTICAST TRAFFIC

(75) Inventors: Patrice Bellagamba, Saint Raphael (FR); Sandesh Kumar B N, Bangalore (IN); Sudhakar Shenoy, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 667 days.

(21) Appl. No.: 12/872,058

(22) Filed: Aug. 31, 2010

(65) Prior Publication Data

US 2012/0051358 A1 Mar. 1, 2012

(51) Int. Cl.
*H04L 12/28* (2006.01)
(52) U.S. Cl.
USPC .......................................... 370/254
(58) Field of Classification Search
None
See application file for complete search history.

(56) References Cited

U.S. PATENT DOCUMENTS

| | | | |
|---|---|---|---|
| 6,661,789 B1 * | 12/2003 | Cankaya et al. | 370/390 |
| 8,443,074 B2 * | 5/2013 | Bahl et al. | 709/224 |
| 2007/0177525 A1 * | 8/2007 | Wijnands et al. | 370/254 |
| 2007/0177594 A1 * | 8/2007 | Kompella | 370/390 |
| 2010/0153701 A1 | 6/2010 | Shenoy et al. | |
| 2012/0188909 A1 * | 7/2012 | Previdi et al. | 370/254 |

* cited by examiner

*Primary Examiner* — Kevin C Harper
(74) *Attorney, Agent, or Firm* — Baker Botts L.L.P.

(57) ABSTRACT

In certain embodiments, routing multicast traffic includes generating a multicast distribution tree for each mapping of a plurality of mappings. A mapping associates a source with a multicast group. Each multicast group has at least two multicast distribution trees. A frame destined for a first multicast group is received. The first multicast group has a first multicast distribution tree and a second multicast distribution tree. The first multicast distribution tree, but not the second multicast distribution tree, is selected for the frame. The frame is sent over a path designated by the selected multicast distribution tree.

21 Claims, 7 Drawing Sheets

LOAD BALANCING MULTICAST TRAFFIC

TECHNICAL FIELD

The present disclosure relates generally to telecommunications.

BACKGROUND

A Local Area Network (LAN) may communicate packets to another LAN over a core network. The LAN may encapsulate the packets before sending the packets over the core network. The encapsulation may hide parts of the packets from the core network.

DESCRIPTION OF EXAMPLE EMBODIMENTS

Overview

In certain embodiments, routing multicast traffic includes generating a multicast distribution tree for each mapping of a plurality of mappings. A mapping associates a source with a multicast group. Each multicast group has at least two multicast distribution trees. A frame destined for a first multicast group is received. The first multicast group has a first multicast distribution tree and a second multicast distribution tree. The first multicast distribution tree, but not the second multicast distribution tree, is selected for the frame. The frame is sent over a path designated by the selected multicast distribution tree.

Description

Figure 1:
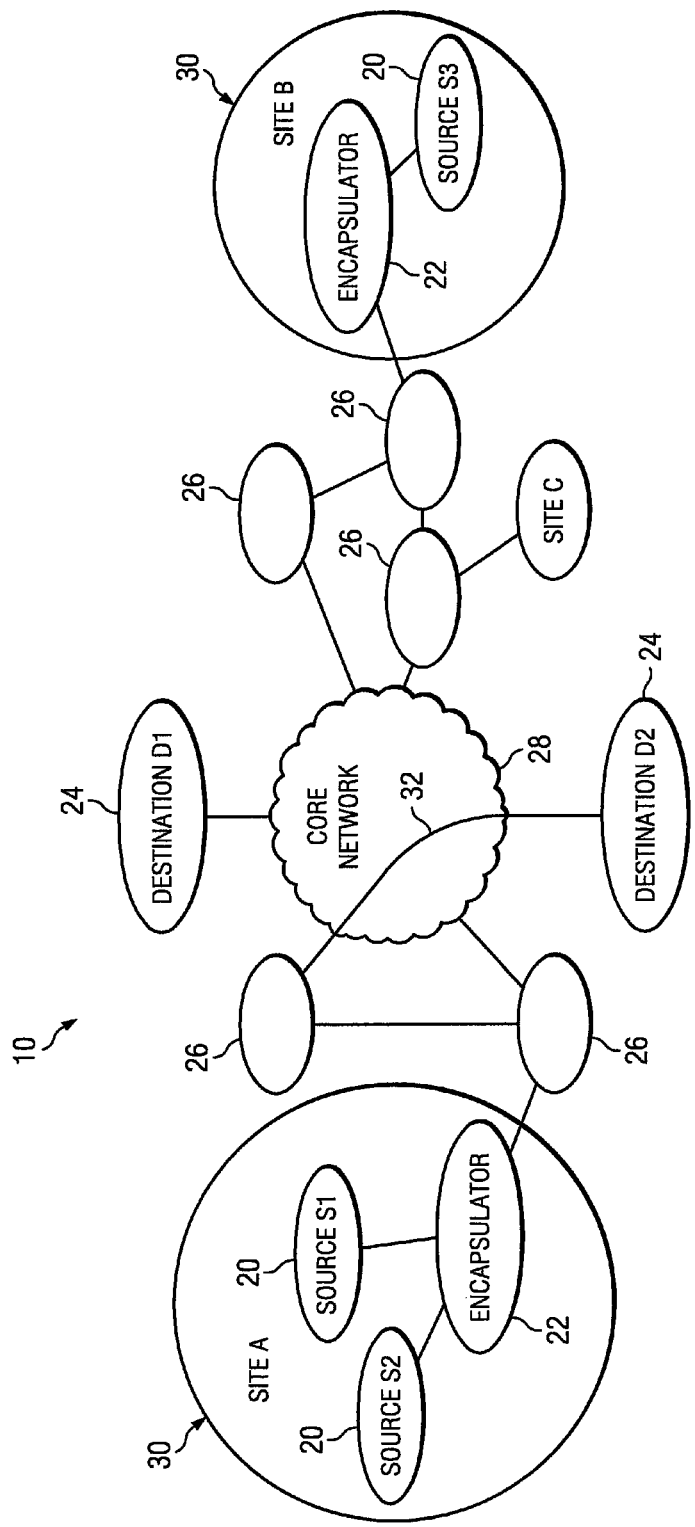
FIG. 1 illustrates an example of an apparatus that may be used to route multicast traffic.

FIG. 1 illustrates an example of a system 10 that may be used to route multicast traffic. In the illustrated example, system 10 includes one or more sites 30 (A-C) coupled to a core network 28 with one or more edge devices 26. Sites 30 may include one or more sources 20 (S1-S3) and one or more encapsulators 22. A source 20 may communicate packets to a destination 24 using a tunnel 32 through core network 28.

In certain embodiments, an encapsulator 22 may generate a multicast distribution tree for each combination of a source and a multicast group. Each multicast group may have two or more multicast distribution trees. In the embodiments, encapsulator 22 may receive a frame destined for a multicast group, select a multicast distribution tree for the frame, and send the frame over a path designated by the selected multicast distribution tree. In certain embodiments, encapsulator 22 may select the multicast distribution tree according to a load balancing technique.

In certain embodiments, a site 30 and core network 28 may include one or more network elements. Examples of network elements include switches, gateways, bridges, load-balancers, firewalls, or any other suitable device operable to communicate in a network environment.

In certain embodiments, a site 30 may be a communication network such as a Local Area Network (LAN) or a virtual LAN (VLAN). In certain embodiments, a site 30 may operate as a Virtual Private LAN Service (VPLS) that may provide Ethernet-based multipoint-to-multipoint communication over core network 28. Sites 30 may be extended to the edge of core network 28, which may emulate a switch to connect sites 30 to create a single bridged site 30. In certain embodiments, a site 30 may be a private (or secured) network that implements access controls that restrict access to authorized users.

A source 20 may be any suitable device configured to multicast packets to a multicast group comprising destinations 24, such as multicast receiver elements (MREs) or receivers. In certain embodiments, a source may have a loopback address that may be used to route packets back to the source. For example, multicast sources S1 and S2 have loopback addresses X1 and X2, respectively. A destination 24 may be any suitable device, such as an endpoint or network element, configured to receive packets.

In certain embodiments, a Reverse Path Forwarding (RPF) procedure may be performed to prevent looping. When a multicast packet arrives at an incoming interface, the RPF procedure checks that the incoming interface is the outgoing interface used by unicast routing to reach the source of the multicast packet. If this condition is satisfied, the packet is forwarded; otherwise, the packet is not forwarded.

An encapsulator 22 encapsulates traffic for transport over core network 28. Encapsulator 22 may be its own device or be part of any suitable device, such as source 20. In certain embodiments, encapsulator 22 may encapsulate Layer 2 (L2) bridging traffic for transport over core network 28 according to a Trunk Encapsulation Format (TEF). Any suitable encapsulation format may be used, such as Internet Protocol (IP)/MultiProtocol Label Switching (MPLS) encapsulation format. Encapsulation may hide the edge frame from core network 28.

Core network 28 may provide paths for the exchange of information between different sub-networks. For example, core network 28 may include high capacity communication facilities that connect nodes to provide telecommunication services to customers of access networks. Core network 28 may route calls across a public switched telephone network (PSTN).

In certain embodiments, core network 28 may have tunnels 32 that communicate information between source site 20 and destination site 24. A tunnel 32 may comprise a pseudo-wire. In certain embodiments, core network 28 may be a public (or unsecured) network that provides open access to network resources, with little or no access controls. The Internet is an example of core network 20.

Core network 28, such as edge devices 26 of core network 28, may have any suitable topology. For example, edge devices 26 may form a ring and/or a mesh. Each of one or more edge devices 26 may be coupled to one or more sites 30. In certain embodiments, the topology of core network 28 may yield unequal cost to load balancing. An unequal cost to load balancing may be difficult to accommodate with known methods.

Figure 2:
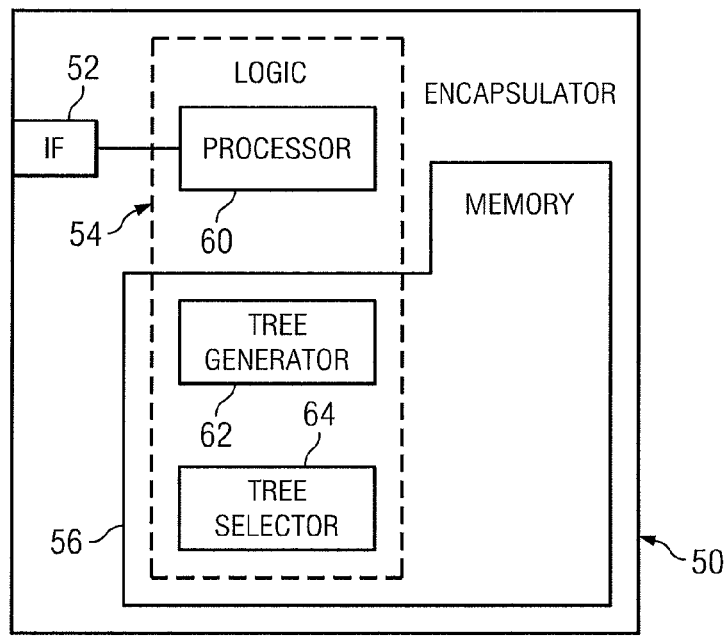
FIG. 2 illustrates an example of an encapsulator.

FIG. 2 illustrates an example of an encapsulator 50. In the illustrated example, encapsulator 50 includes an interface 52, logic 54, and memory 56. Logic 54 includes a processor 60 and applications such as a tree generator 62 and tree selector 64. Memory 56 stores tree generator 62 and tree selector 64.

Tree generator 62 generates multicast distribution trees that designates paths that multicast traffic takes through core network 28. A multicast distribution tree may be a source tree. The root represents the source of the multicast distribution tree, and the branches form a spanning tree through a network to the destinations. A multicast distribution tree may be a shortest path tree (SPT) that uses the shortest path from the source to the destination.

To create distribution trees, tree generator 62 exchanges state information with other devices through control messages such as join messages or membership reports. The state information from a device may describe network elements that are one, two, or more hops away from the device.

In certain embodiments, tree generator 62 generates a multicast distribution tree for each source-group combination (or "source-group mapping" or "mapping") that includes a source and a multicast group. A multicast distribution tree for a source-group combination may indicate how to distribute frames from the source to the multicast group. In certain embodiments, tree generator 62 may generate more than one multicast distribution tree that indicate how to distribute frames from more than one source to a particular multicast group.

In the example of FIG. 1, multicast sources S1 and S2 (with loopback addresses X1 and X2, respectively) may multicast to multicast groups G1 and G2. Group G1 includes members H1, and group G2 includes members H1 and H2. Members H1 and H2 may be part of the same VLAN. An Outgoing InterFace (OIF) list includes links to P1 and/or P2. A link to P1 may connect to source S1, and link to P2 may connect to source S2. A slot 2 may couple link to P1 towards core network 28, and a slot 3 may couple link to P2 to core network 28.

In the example, the source-group combinations include (X1, G1), (X2, G1), (X1, G2), and (X2, G2). In the example, tree generator 62 may generate multicast distribution trees (X1, G1), (X2, G1), (X1, G2), and (X2, G2):

(X1, G1) RPF: X1 loopback address
OIF: link connected to P1
(X2, G1) RPF: X2 loopback address
OIF: link connected to P2
(X1, G2) RFP: X1 loopback address
OIF: link connected to P1
(X2, G2) RPF: X2 loopback address
OIF: link connected to P2

In certain embodiments, tree generator 62 creates a source-group state for each source-group multicast distribution tree. In the example, two (S,G) states on each n-P1 are created for each multicast group. In certain embodiments, tree generator 62 may confirm that core network 28 can reach X1 through link P1 and X2 through link P2.

Tree selector 64 selects a tree used to route a frame. The tree may be selected in any suitable manner. In certain embodiments, tree selector 64 may perform a hash on frame information of the frame. A hash may be a mathematical function applied to frame information of one or more fields of a frame to compute a selector value. The frame information may include any suitable information, for example, a multicast group identifier or Layers 2, 3, and/or 4 information. Examples of Layer 2 information include a source Media Access Control (MAC) address (SMAC), a destination MAC address (DMAC), both SMAC and DMAC, and/or SMAC XOR DMAC. Examples of Layer 3 information include a destination (DST) IP address (DST-IP), a source (SRC) IP address (SRC-IP), and/or SRC-IP XOR DST-IP. Examples of Layer 4 information include a SRC-IP and Transmission Control Protocol/User Datagram Protocol (TCP/UDP) Port, a SRC TCP/UDP Port, and/or SRC TCP/UDP Port XOR DST TCP/UDP Port.

The hash may be calculated from the frame information in any suitable manner. In certain embodiments, each tree is assigned a unique region in hash space. The hash space may be divided into equal regions such that there is equal usage among the trees, or the hash space may be divided into unequal regions such that there is unequal usage among the trees. When tree selector 64 receives a frame, tree selector 64 examines the packet header fields that include the frame information. Tree selector 64 performs a hash algorithm (for example, CRC16) over the packet header fields to determine a hash and selects the tree assigned to the hash space of the hash. For example, a hash value may yield selection of a first source corresponding to a first tree, and a different hash value may lead to selection of a second source corresponding to a second tree.

In certain embodiments, the tree may be selected in order to load balance the traffic to optimize the traffic across the sources. Any suitable load balancing technique may be used to select the trees. Examples of load balancing techniques include the hash technique as well as round robin and random selection techniques. Other examples of load balancing techniques may take into account factors such as a servers reported load, response times, up/down status, number of active connections, geographic location, capabilities, assigned traffic, and/or other suitable factors.

Figure 3:
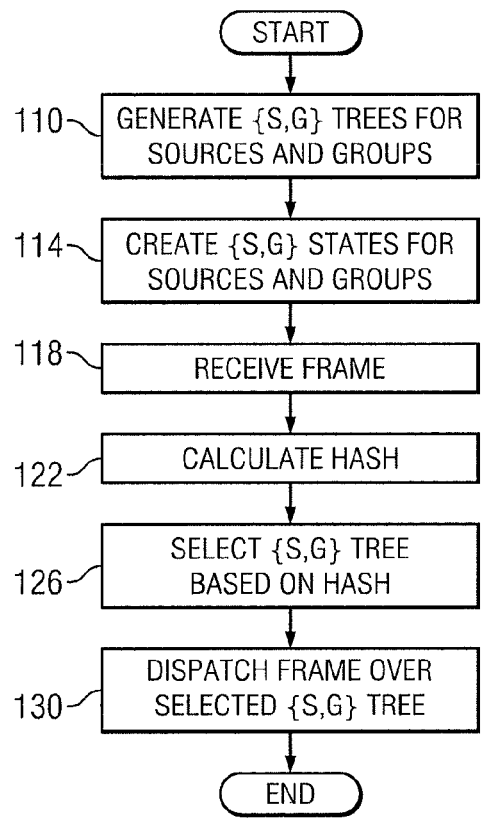
FIG. 3 illustrates an example of a method for routing multicast traffic.

FIG. 3 illustrates an example of a method for routing multicast traffic. The method starts at step 110, where tree generator 62 of site 20*b* generates multicast distribution trees for sources S1 and S2 and multicast groups G1 and G2. In certain embodiments, tree generator 62 may generates a multicast distribution tree for each source-group combination to yield multicast distribution trees (X1, G1), (X2, G1), (X1, G2), and (X2, G2). States for sources S1 and S2 and groups G1 and G2 are created at step 114. In certain embodiments, states (X1, G1), (X2, G0, (X1, G2), and (X2, G2) may be created.

Encapsulator 50 receives a frame for group G1 at step 118. Tree selector 64 calculates a hash from the received frame at step 122. In certain embodiments, tree selector 64 may calculate a hash by applying a hash algorithm to packet header fields that include frame information. Tree selector 64 selects a multicast distribution tree based on the hash at step 126. For example, tree selector 64 selects the tree assigned to the hash space of the calculated hash. For example, tree (X1, G1) or tree (X2, G1) may be selected. The selection may serve to load balance traffic across the sources.

Tree selector 64 dispatches the frame to group G1 according to the selected tree at step 130. For example, the frame is sent along a path designated by the selected tree. The method then ends.

Figure 4:
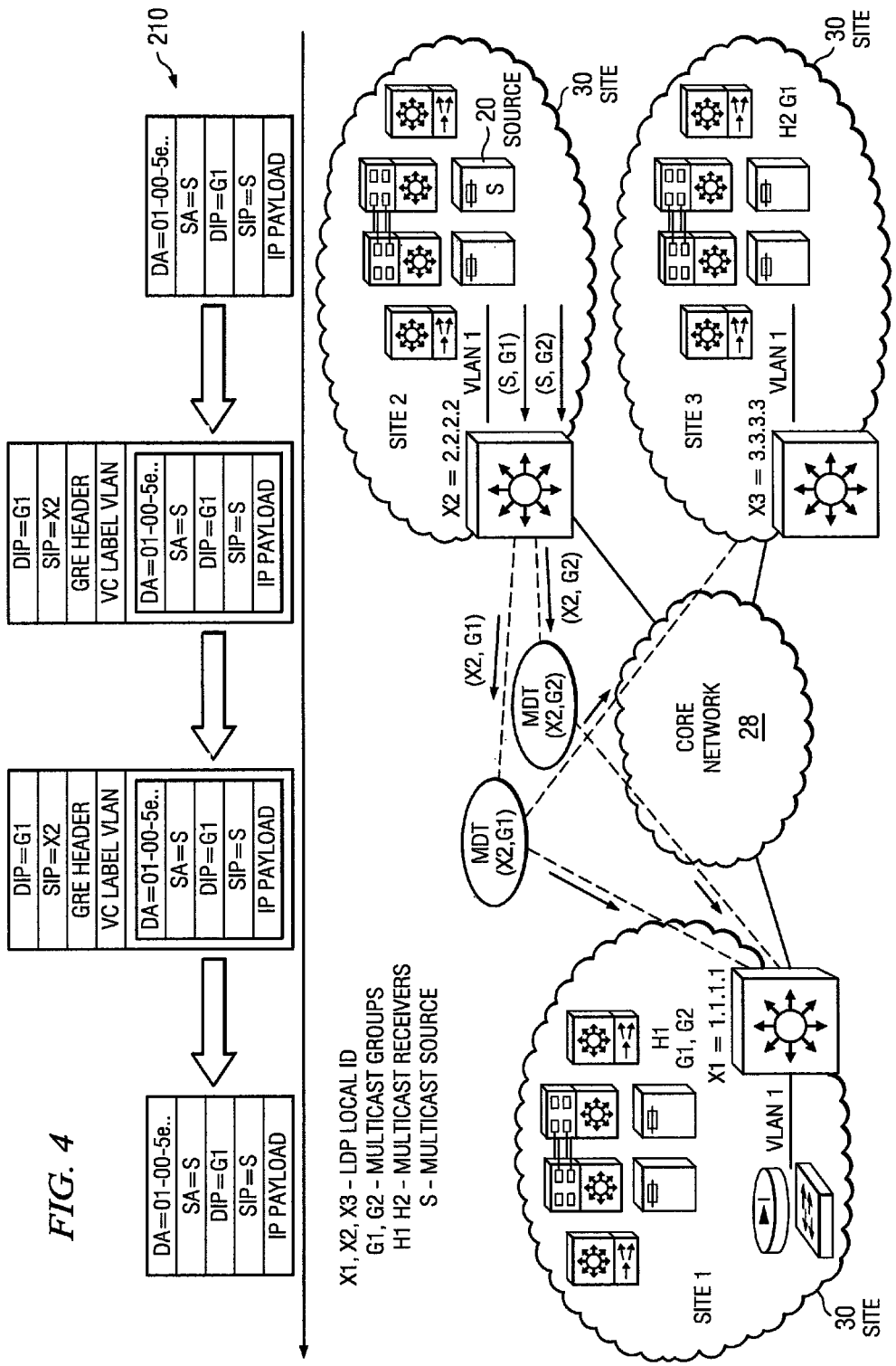
FIG. 4 illustrates an example of a multicast source sending packets to different multicast groups of sites.

FIG. 4 illustrates an example of a multicast source 20 sending packets to different multicast groups of sites 30. In the example, MDT represents a multicast distribution tree, DA represents a destination address, SA represents a source address, DIP represents a destination IP address, and SIP represents a source IP address. In the example, multicast source S of site 2 sends packets to multicast groups G1 and G2. Members of group G2 are in site 1, and members of group G1 are in site 2. Flow sequence 210 is expressed with respect to host H1 in site 1.

Figure 5:
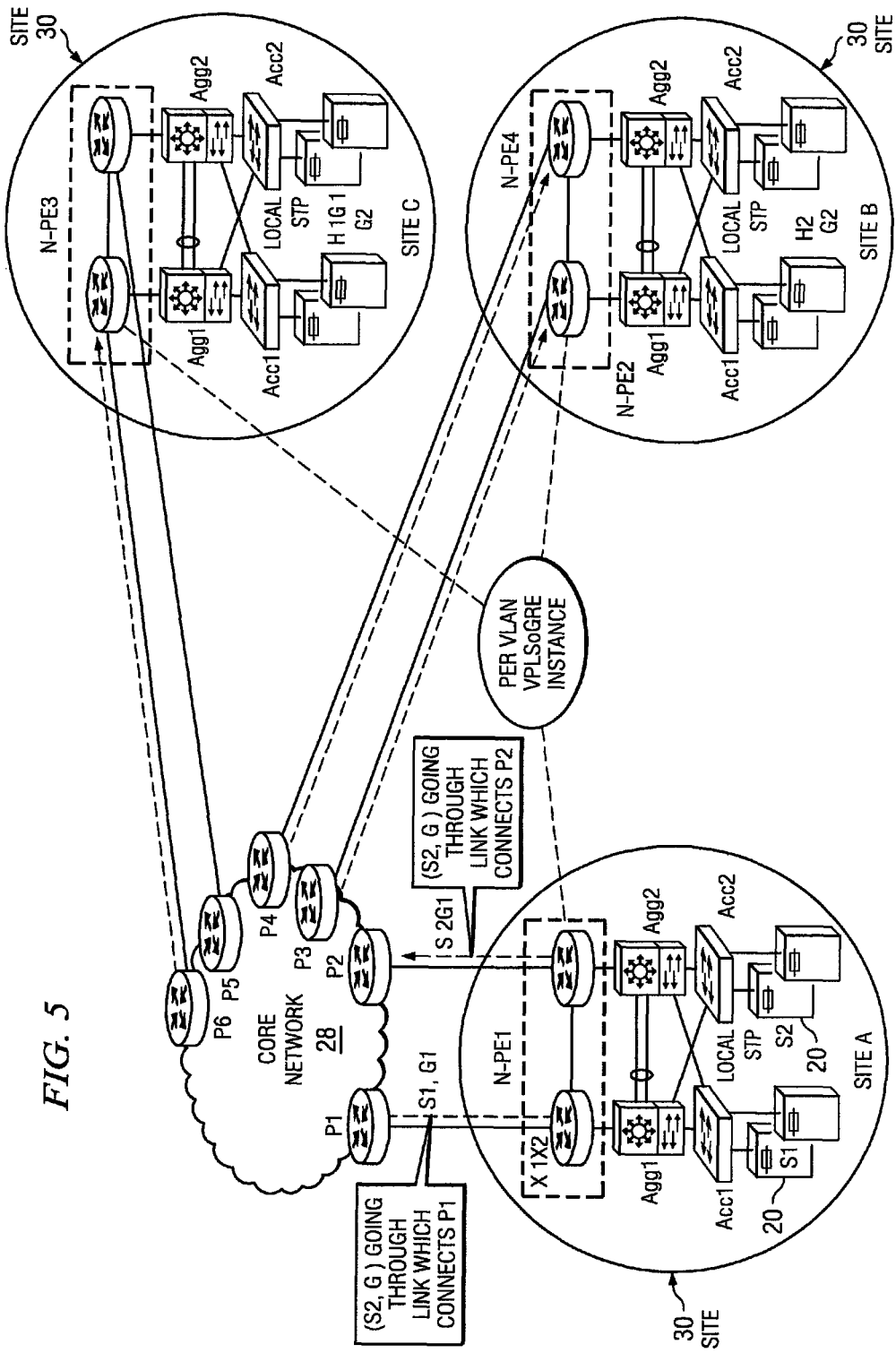
FIG. 5 illustrates an example of multicast sources sending packets to different multicast groups of sites.

FIG. 5 illustrates an example of multicast sources 20 sending packets to different multicast groups of sites 30. In the example, Acc represents an access node, Agg represents an aggregation node, P represents a router, and N-PE represents an edge router. The example is described in more detail with reference to FIG. 2.

Figure 6:
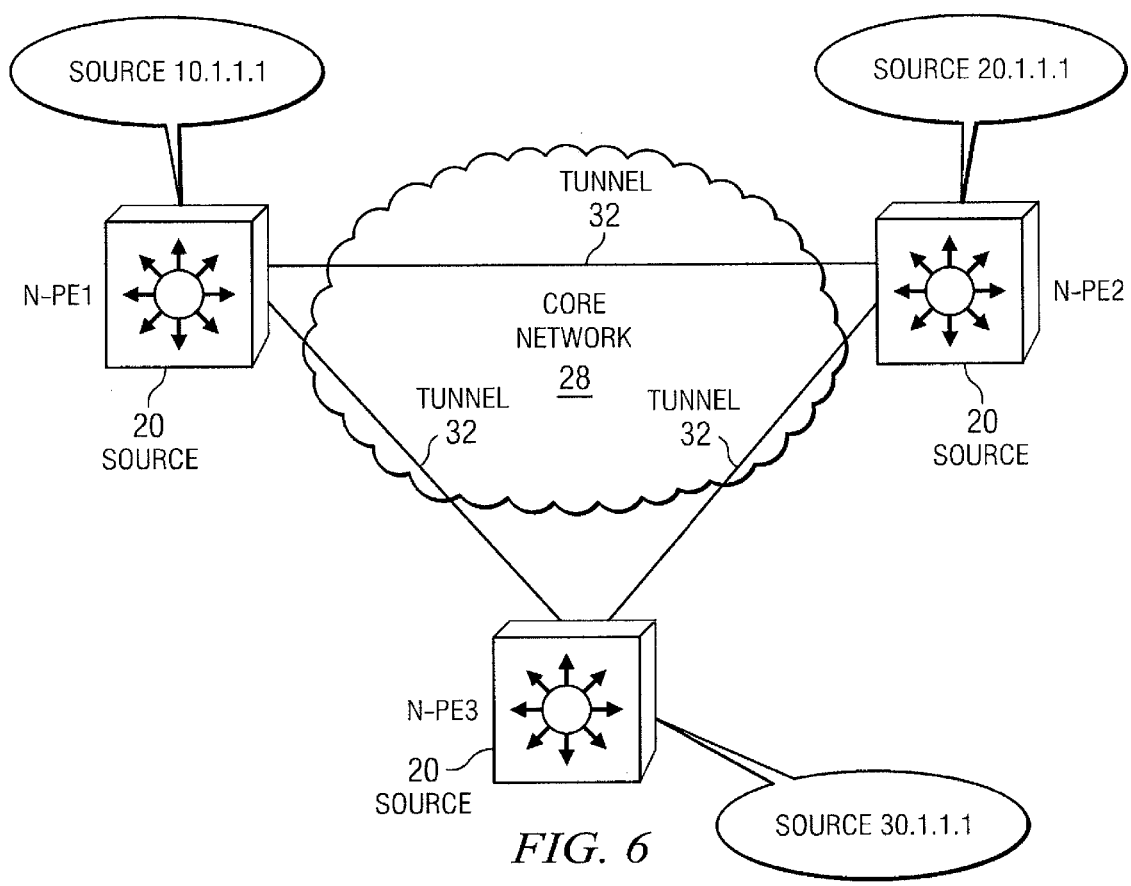
FIG. 6 illustrates an example of using one multicast tree for a set of VLANs.
Figure 7:
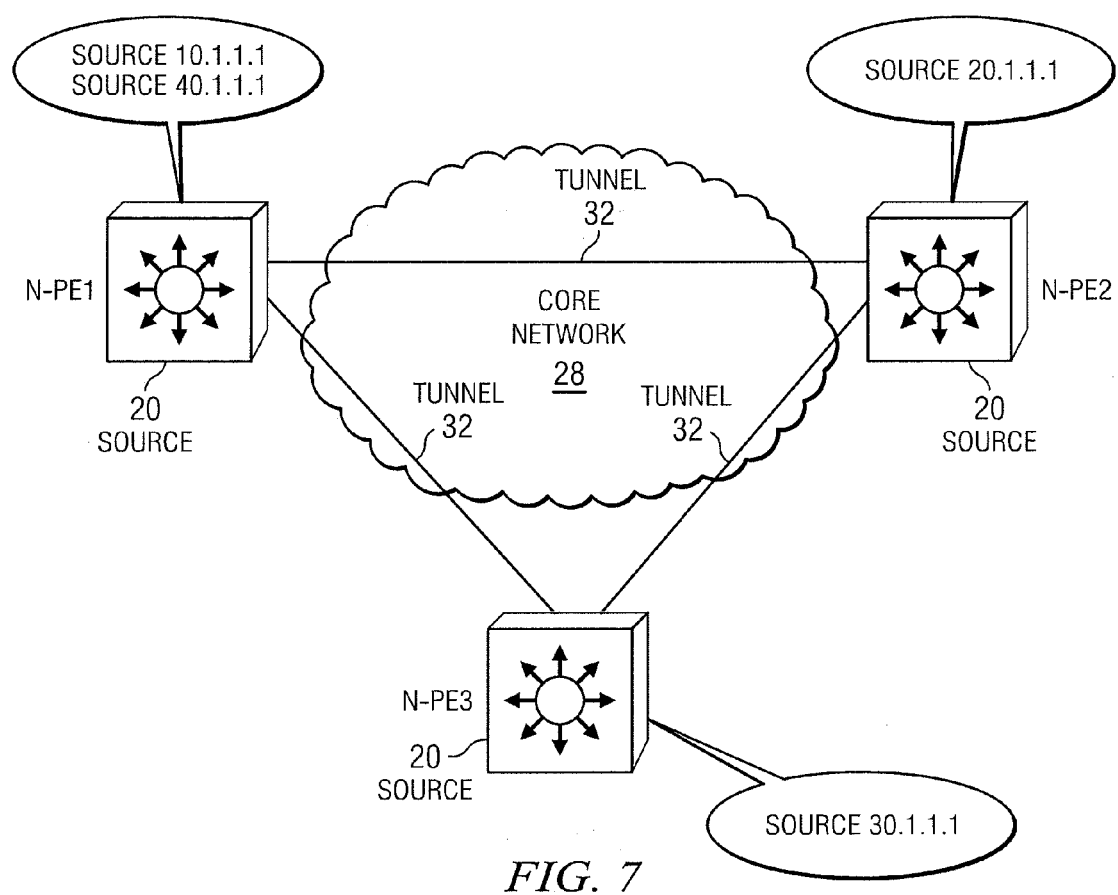
FIG. 7 illustrates an example of using different multicast trees for a set of VLANs.
Figure 8:
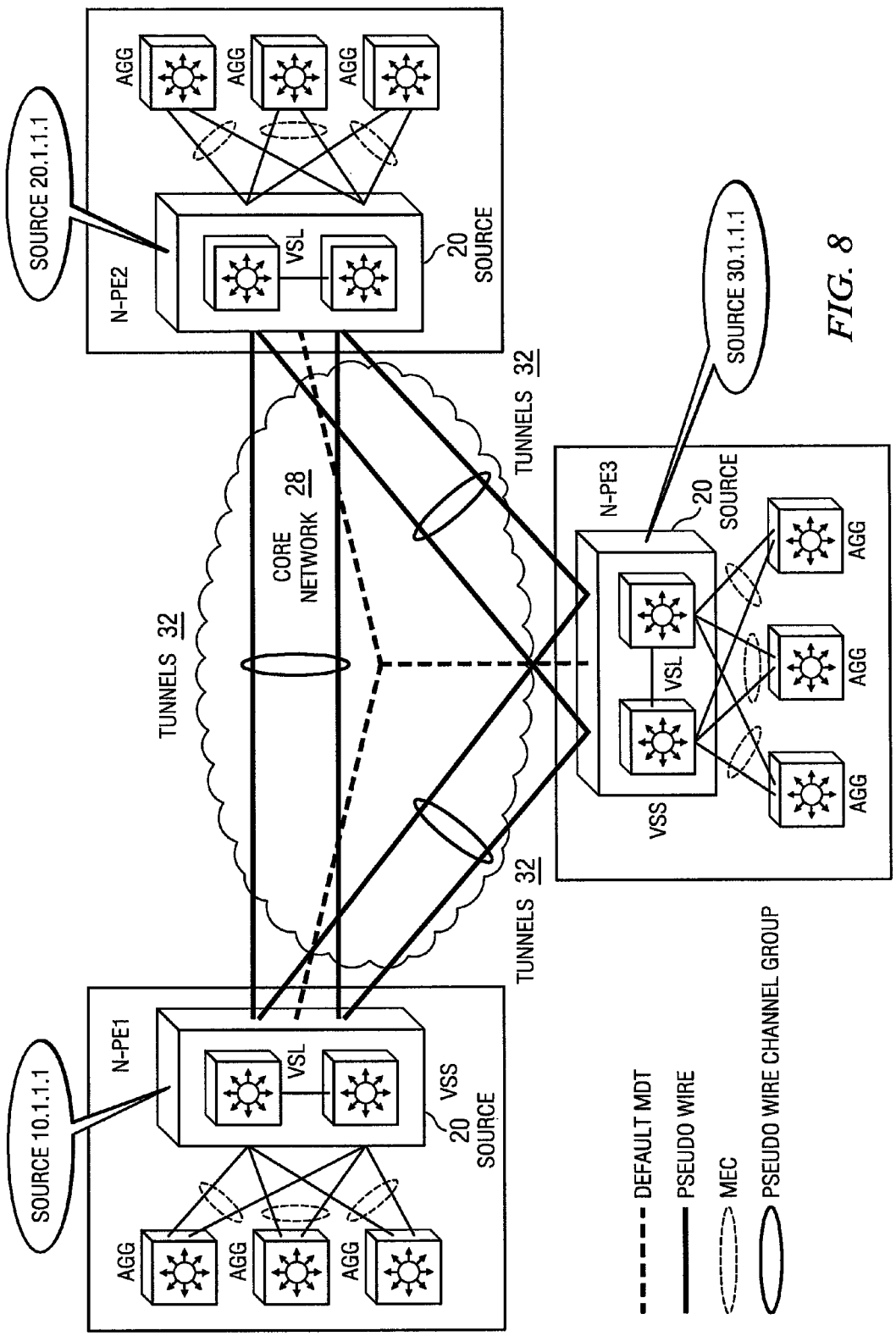
FIG. 8 illustrates an example of load balancing.

FIGS. 6 through 8 illustrates examples of multicasting. In the examples, DC represents a site, VSS represents a virtual switch system, and VSL represents a virtual switch link.

In the examples, the following example commands may be used.

Command: l2mdt-src-maplist
Description: This command creates a remote source list that is connected to the peer N-PE
Syntax: (config)#l2mdt-src-maplist<WORD>
Command: l2-mdt remote-source active tunnel<ID>
Description: This command configures the proxy peer-source address on the N-PE's in the same VPLS domain. The keyword "active" indicates that there is an active multicast source on the N-PE that is connected through the "tunnel<ID>".
Syntax: (config-l2mdt-src-maplist)#l2mdt remote-source active tunnel<ID>
Command: l2vpn multicast-class<ID>
Description: This command creates a new l2vpn multicast-class that has to apply in P2P tunnel.
Syntax: (config)#l2vpn multicast-class<ID>
Command: broadcast group-id<bidir group>
Description: This is the PIM bidirectional multicast group configured on the N-PEs in the same VPLS domain. MDT is built in the core for this particular group.
Syntax: (config-l2vpn-mcast)#broadcast group-id<bidir group>
Command: multicast l2-mdt-source<IP address>
Description: This is the local proxy source address configured on the N-PE
Syntax: (config-l2vpn-mcast)#multicast l2-mdt-source<IP address>
Command: peer-source l2mdt-source-maplist<WORD>
Description: This command applies the source maplist configured on the multicast class
Syntax: (config-l2vpn-mcast)#peer-source l2mdt-src-maplist<WORD>
Command: multicast allowed vlan<WORD>
Description: If a different source tree is required for a set of vlans, this command specifies the set vlans for which the different source is required.
Syntax: (config-l2vpn-mcast)#multicast allowed vlan<WORD>

FIG. 6 illustrates an example of using one tree for allowed VLANs of a tunnel. Multicasting may be performed in any suitable manner. In the example, the following may be performed.
Step 1: Configure remote-source map list
l2mdt-src-maplist dc_source_list
    l2-mdt remote-source 20.1.1.1 active tunnel 100
    l2-mdt remote-source 30.1.1.1 tunnel 200
Step 2: Configure l2vpn multicast-class
l2vpn multicast-class 100
    broadcast group-id<bidir group>
        multicast l2-mdt-source 10.1.1.1
        peer-peer-source l2mdt-src-maplist dc_source_list
Step 3: Apply multicast-class command on P2P tunnel
int tunnel 100
    description "facing towards N-PE2"
    tunnel source 1.1.1.1
    tunnel destination 2.2.2.2
    switchport
    switchport mode trunk encapsulation l2ogre encapsulation vplsogre
    switchport trunk allowed vlan 1-100
    l2vpn multicast-class 100
int tunnel 200
    description "facing towards N-PE3"
    tunnel source 3.3.3.3
    tunnel destination 4.4.4.4
    switchport
    switchport mode trunk encapsulation l2ogre encapsulation vplsogre
    switchport trunk allowed vlan 1-100
    l2vpn multicast-class 100

FIG. 7 illustrates an example of using different multicast trees for a set of VLANs. Multicasting may be performed in any suitable manner. In the example, the following may be performed.
Step 1: Configure remote-source map list
l2mdt-src-maplist dc_source_list_default
    l2-mdt remote-source 20.1.1.1 active tunnel 100
    l2-mdt remote-source 30.1.1.1 tunnel 200
Step 2: Configure l2vpn multicast-class
l2vpn multicast-class 100
    broadcast group-id<bidir group>
    multicast l2-mdt-source 10.1.1.1
    peer-source l2mdt-src-maplist dc_source_list_default
l2vpn multicast-class 200
    broadcast group-id<bidir group>
    multicast l2-mdt-source 40.1.1.1
    multicast allowed vlan 30-50 (Different source tree built for vlans 30-50)
    peer-source l2mdt-src-maplist dc_source_list_default
Step 3: Apply multicast-class command on P2P tunnel
int tunnel 100
    tunnel source 1.1.1.1
    tunnel destination 2.2.2.2
    switchport
    switchport mode trunk encapsulation l2ogre
    switchport trunk allowed vlan 1-100
    l2vpn multicast-class 100
    l2vpn multicast-class 200
int tunnel 200
    tunnel source 1.1.1.1
    tunnel destination 2.2.2.2
    switchport
    switchport mode trunk encapsulation l2ogre
    switchport trunk allowed vlan 1-100
    l2vpn multicast-class 100

FIG. 8 illustrates an example of load balancing. Load balancing may be performed in any suitable manner. In the example, the following may be performed.
Step 1: Configure remote-source map list
l2mdt-src-maplist dc_source_list1
    l2-mdt remote-source 20.1.1.1 active tunnel 100
        l2-mdt remote-source 20.1.1.2 active tunnel 101
        l2-mdt remote-source 30.1.1.1 active tunnel 200
        l2-mdt remote-source 30.1.1.2 active tunnel 201
Step 2: Configure l2vpn multicast-class
l2vpn multicast-class 100
    broadcast group-id<bidir group>
    multicast l2-mdt-source 10.1.1.1 10.1.1.2
    multicast allowed vlan 10-20
    peer-source l2mdt-src-maplist dc_source_list1

Step 3: Apply multicast-class command on P2P tunnel. Tunnels 100 and 101 are facing towards N-PE2

```
int tunnel 100
    tunnel source 1.1.1.1
    tunnel destination 2.2.2.2
    switchport
    switchport mode trunk encapsulation 12ogre
    switchport trunk allowed vlan 1-100
    channel-group 10 mode on
    12vpn multicast-class 100
int tunnel 101
    tunnel source 10.10.10.10
    tunnel destination 20.20.20.20
    switchport
    switchport mode trunk encapsulation 12ogre
    switchport trunk allowed vlan 1-100
    channel-group 10 mode on
    12vpn multicast-class 100
```

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of source 20 and encapsulator 22 may be performed by one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more non-transitory tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more non-transitory computer readable media encoded with a computer program, software, computer executable instructions, and/or instructions capable of being executed by a computer. In particular embodiments, the operations of the embodiments may be performed by one or more non-transitory computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   identifying a plurality of mappings of sources to a plurality of multicast groups, the plurality of mappings comprising a mapping for each combination of a particular source and a particular multicast group, each of the plurality of multicast groups having a set of members;
   generating a multicast distribution tree for each source-multicast group combination, a mapping associating a source with a multicast group, each multicast group having at least two multicast distribution trees;
   receiving, from a first source a frame destined for a first multicast group, the first multicast group having a first multicast distribution tree and a second multicast distribution tree;
   selecting the first multicast distribution tree but not the second multicast distribution tree for the frame;
   sending, via an outgoing interface, the frame over a path designated by the selected multicast distribution tree;
   in response to receiving a loopback packet from a destination within the first multicast group, determining that the loopback packet is received on an incoming interface that is the same as the outgoing interface; and
   in response to determining that the incoming interface is the same as the outgoing interface, forwarding the loopback packet to the first source.

2. The method of claim 1, the selecting the first multicast distribution tree further comprising:
   selecting the first multicast distribution tree according to a load balancing technique.

3. The method of claim 1, the selecting the first multicast distribution tree further comprising:
   calculating a hash for the frame; and
   selecting the first multicast distribution tree because the first multicast distribution tree corresponds to the calculated hash.

4. The method of claim 1, the selecting the first multicast distribution tree further comprising:
   calculating a hash from Layer 2 information of the frame; and
   selecting the first multicast distribution tree because the first multicast distribution tree corresponds to the calculated hash.

5. The method of claim 1, further comprising:
   creating a plurality of source-group combination states, each source-group combination state corresponding to a multicast distribution tree.

6. The method of claim 1, the generating a multicast distribution tree further comprising:
generating a multicast distribution tree for a loopback address corresponding to the first source.

7. The method of claim 1, each source corresponding to a virtual local area network (VLAN).

8. An apparatus comprising:
one or more non-transitory computer readable media configured to store computer executable instructions; and
one or more processors coupled to the memory, the processors configured, when executing the instructions, to:
identify a plurality of mappings of sources to a plurality of multicast groups, the plurality of mappings comprising a mapping for each combination of a particular source and a particular multicast group, each of the plurality of multicast groups having a set of members;
generate a multicast distribution tree for each source-multicast group combination, a mapping associating a source with a multicast group, each multicast group having at least two multicast distribution trees;
receive, from a first source, a frame destined for a first multicast group of the plurality of multicast groups, the first multicast group having a first multicast distribution tree and a second multicast distribution tree;
select the first multicast distribution tree but not the second multicast distribution tree for the frame;
send, via an outgoing interface, the frame over a path designated by the selected multicast distribution tree;
in response to receiving a loopback packet from a destination within the first multicast group, determine that the loopback packet is received on an incoming interface that is the same as the outgoing interface; and
in response to determining that the incoming interface is the same as the outgoing interface, forward the loopback packet to the first source.

9. The apparatus of claim 8, the selecting the first multicast distribution tree further comprising:
selecting the first multicast distribution tree according to a load balancing technique.

10. The apparatus of claim 8, the selecting the first multicast distribution tree further comprising:
calculating a hash for the frame; and
selecting the first multicast distribution tree because the first multicast distribution tree corresponds to the calculated hash.

11. The apparatus of claim 8, the selecting the first multicast distribution tree further comprising:
calculating a hash from Layer 2 information of the frame; and
selecting the first multicast distribution tree because the first multicast distribution tree corresponds to the calculated hash.

12. The apparatus of claim 8, the processors configured to:
create a plurality of source-group combination states, each source-group combination state corresponding to a multicast distribution tree.

13. The apparatus of claim 8, the generating a multicast distribution tree further comprising:
generating a multicast distribution tree for a loopback address corresponding to the first source.

14. The apparatus of claim 8, each source corresponding to a virtual local area network (VLAN).

15. One or more non-transitory computer readable media storing one or more computer executable instructions and when executed by one or more processors configured to:
identify a plurality of mappings of sources to a plurality of multicast groups, the plurality of mappings comprising a mapping for each combination of a particular source and a particular multicast group, each of the plurality of multicast groups having a set of members;
generate a multicast distribution tree for each source-multicast group combination, a mapping associating a source with a multicast group, each multicast group having at least two multicast distribution trees;
receive, from a first source, a frame destined for a first multicast group of the plurality of multicast groups, the first multicast group having a first multicast distribution tree and a second multicast distribution tree;
select the first multicast distribution tree but not the second multicast distribution tree for the frame;
send, via an outgoing interface, the frame over a path designated by the selected multicast distribution tree;
in response to receiving a loopback packet from a destination within the first multicast group, determine that the loopback packet is received on an incoming interface that is the same as the outgoing interface; and
in response to determining that the incoming interface is the same as the outgoing interface, forward the loopback packet to the first source.

16. The media of claim 15, the selecting the first multicast distribution tree further comprising:
selecting the first multicast distribution tree according to a load balancing technique.

17. The media of claim 15, the selecting the first multicast distribution tree further comprising:
calculating a hash for the frame; and
selecting the first multicast distribution tree because the first multicast distribution tree corresponds to the calculated hash.

18. The media of claim 15, the selecting the first multicast distribution tree further comprising:
calculating a hash from Layer 2 information of the frame; and
selecting the first multicast distribution tree because the first multicast distribution tree corresponds to the calculated hash.

19. The media of claim 15, configured to:
create a plurality of source-group combination states, each source-group combination state corresponding to a multicast distribution tree.

20. The media of claim 15, the generating a multicast distribution tree further comprising:
generating a multicast distribution tree for a loopback address corresponding to the first source.

21. The media of claim 15, each source corresponding to a virtual local area network (VLAN).

* * * * *